United States Patent
Takikawa

(10) Patent No.: US 10,618,173 B2
(45) Date of Patent: Apr. 14, 2020

(54) PROCESSING SYSTEM AND METHOD FOR CONTROLLING PROCESSING MACHINE

(71) Applicant: FANUC CORPORATION, Yamanashi (JP)

(72) Inventor: Ryuji Takikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 42 days.

(21) Appl. No.: 16/116,911

(22) Filed: Aug. 30, 2018

(65) Prior Publication Data

US 2019/0099888 A1    Apr. 4, 2019

(30) Foreign Application Priority Data

Sep. 29, 2017   (JP) ................ 2017-191377

(51) Int. Cl.
| | |
|---|---|
| *G05B 19/18* | (2006.01) |
| *B25J 9/16* | (2006.01) |
| *G05B 19/404* | (2006.01) |
| *G01H 1/00* | (2006.01) |

(52) U.S. Cl.
CPC ........... *B25J 9/1692* (2013.01); *B25J 9/1694* (2013.01); *G05B 19/404* (2013.01); *G01H 1/00* (2013.01); *G05B 2219/39241* (2013.01); *G05B 2219/41122* (2013.01)

(58) Field of Classification Search
CPC combination set(s) only.
See application file for complete search history.

(56) References Cited

U.S. PATENT DOCUMENTS

| | | | |
|---|---|---|---|
| 9,724,825 B2* | 8/2017 | Iwatake | ................. B25J 9/1633 |
| 10,131,025 B2* | 11/2018 | Kitayama | ............. B23Q 15/22 |
| 2011/0238217 A1* | 9/2011 | Kume | .................. A61G 7/1017 |
| | | | 700/275 |
| 2014/0276939 A1* | 9/2014 | Kokish | ............. A61M 25/0113 |
| | | | 606/130 |

(Continued)

FOREIGN PATENT DOCUMENTS

| | | |
|---|---|---|
| JP | 2010-36285 A | 2/2010 |
| JP | 2011-167817 A | 9/2011 |

(Continued)

*Primary Examiner* — Bhavesh V Amin
(74) *Attorney, Agent, or Firm* — Hauptman Ham, LLP

(57) ABSTRACT

A processing system and a method for controlling a processing machine of the system, by which the processing accuracy of the processing machine due to the motion of the robot can be prevented from being deteriorated, without reducing the working ratio of the processing system. A processing machine controller has: a vibration suppression controlling section configured to operate at least one of a table and a processing tool, and calculate an amount of motion correction for reducing the change in a relative position between the table and the processing tool measured by vibration sensors respectively arranged on the table and a tool driving part; a storing section configured to store the calculated amount motion correction; and a program executing section configured to, during the robot performs the predetermined motion, execute the processing program while executing vibration suppressing motion based on the stored amount of motion correction.

6 Claims, 2 Drawing Sheets

(56) References Cited

U.S. PATENT DOCUMENTS

| | | | |
|---|---|---|---|
| 2017/0168023 A1* | 6/2017 | Jan | G01N 29/12 |
| 2018/0079085 A1* | 3/2018 | Nakata | B25J 9/1664 |
| 2019/0099888 A1* | 4/2019 | Takikawa | B25J 9/1694 |

FOREIGN PATENT DOCUMENTS

| | | |
|---|---|---|
| JP | 2011-192267 A | 9/2011 |
| JP | 2014-121788 A | 7/2014 |
| JP | 2016-84838 A | 5/2016 |
| JP | 2016-168661 A | 9/2016 |
| WO | 2015/098126 A1 | 7/2015 |

* cited by examiner

PROCESSING SYSTEM AND METHOD FOR CONTROLLING PROCESSING MACHINE

RELATED APPLICATIONS

The present application claims priority to Japanese Application Number 2017-191377, filed Sep. 29, 2017, the disclosure of which is hereby incorporated by reference herein in its entirety.

BACKGROUND OF THE INVENTION

1. Field of the Invention

The preset invention relates to a processing system including a processing machine, and a method for controlling the processing machine.

2. Description of the Related Art

A robot system having a robot is well-known, in which the robot is positioned within or adjacent a machine tool so that a workpiece can attached to or detached from the machine tool by the root (e.g., JP 2010-036285 A). Further, it is a well-known technique to remove or collect chips or shavings generated from a processing machine by using a robot positioned adjacent the processing machine (e.g., JP 2016-168661 A).

On the other hand, a robot system including a robot is well-known, in which a positional deviation between a gripping part of the robot and an object is detected by an inertial sensor, and the positional relationship between the griping part and the object is adjusted to cancel the positional deviation (e.g., JP 2014-121788 A). Further, a robot having a learning controller is well-known (e.g., JP 2011-167817 A and JP 2011-192267 A).

In a processing system including a robot and a processing machine such as a machine tool, the robot may be used to deburr or clean a processed workpiece during another workpiece is processed by the processing machine. In such a case, the vibration generated by operating the robot may be transmitted to the processing machine, whereby the machining accuracy of the processing machine may be deteriorated. In this case, in order to prevent the machining accuracy from being deteriorated, the robot may be stopped or operated at a relatively low speed during processing. However, when the robot is operated as such, a working ratio of the whole system may be deteriorated (i.e., a cycle time of the system may be extended).

SUMMARY OF THE INVENTION

One aspect of the present disclosure is a processing system comprising: a processing machine having a workpiece holding part and a processing tool configured to be moved relative to each other, the processing machine being configured to process a workpiece held by the workpiece holding part by using the processing tool based on a predetermined processing program; a robot configured to perform a predetermined motion associated with the processing machine; a vibration sensor configured to measure a change in a relative position between the workpiece holding part and the processing tool; a vibration suppression controlling section configured to operate at least one of the workpiece holding part and the processing tool during the robot performs the predetermined motion, and calculate an amount of motion correction for reducing the change in the relative position measured by the vibration sensor; a storing section configured to store the amount motion correction calculated by the vibration suppression controlling section; and a program executing section configured to, during the robot performs the predetermined motion, execute the processing program while executing vibration suppressing motion based on the amount of motion correction stored in the storing section.

Another aspect of the present disclosure is a method for controlling a processing machine having a workpiece holding part and a processing tool configured to be moved relative to each other, the processing machine being configured to process a workpiece held by the workpiece holding part by using the processing tool based on a predetermined processing program, the method comprises the steps of: measuring a change in a relative position between the workpiece holding part and the processing tool during a robot performs a predetermined motion associated with the processing machine; operating at least one of the workpiece holding part and the processing tool, and calculating an amount of motion correction for reducing the measured change in the relative position; storing the calculated amount motion correction; and executing, during the robot performs the predetermined motion, the processing program while executing vibration suppressing motion based on the stored amount of motion correction.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
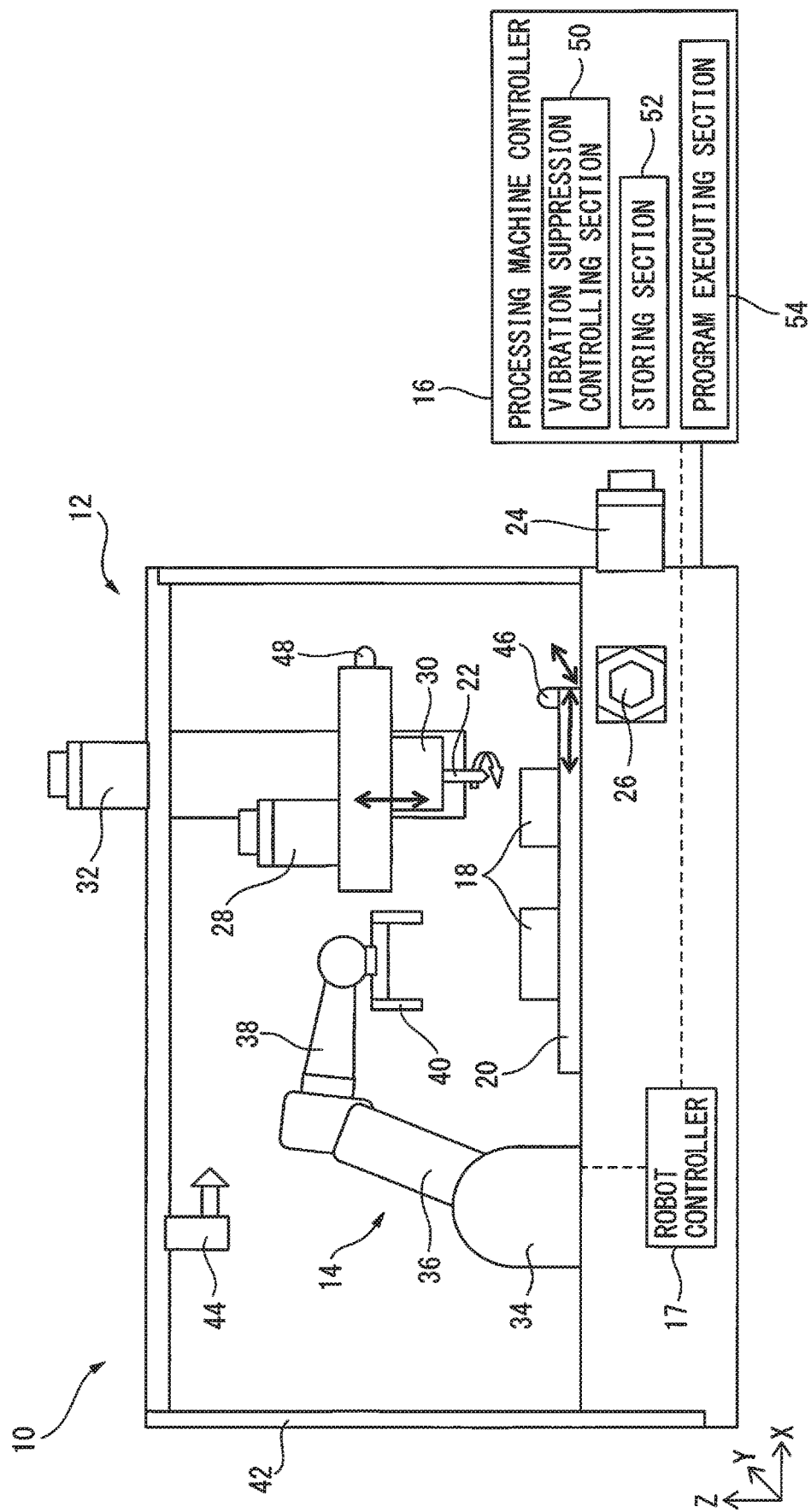
FIG. 1 is a view showing an example of a configuration of a processing system according to an embodiment.

FIG. 1 shows an example of a configuration of a processing system 10 according to a preferred embodiment. Processing system 10 includes a processing machine 12 such as a machine tool, and a robot 14 positioned within or adjacent processing machine 12. Processing machine 12 is controlled by a processing machine controller 16 connected to processing machine 12, and robot 14 is controlled by a robot controller 17 connected to robot 14. Processing machine controller 16 and robot controller 17 may be separate devices (e.g., computers), each having a CPU and a memory, etc. Otherwise, processing machine controller 16 and robot controller 17 may be constituted as a substantially integrated device (e.g., a computer), having a CPU and a memory, etc.

Processing machine 12 has a workpiece holding part (in this example, a table) 20, on which an object (or a workpiece) 18 to be processed can be located, or by which workpiece 18 can be held. Processing machine 12 further has a processing tool 22 configured to perform a predetermined processing for workpiece 18 such as cutting, shaving or piercing, etc. Table 20 and processing tool 22 are configured to move relative to each other. In the drawing, table 20 is configured to be moved in the horizontal plane (both in the X- and Y-directions) by two motors 24, 26 such as servomotors. On the other hand, processing tool 22 is configured to rotate by being held by a tool driving part 30 driven by a motor 28 such as a servomotor, and is configured to move in the vertical direction (the Z-direction) by a motor 32 such as a servomotor.

As robot 14, various types of robots having a movable part such as a robot arm can be used. In the drawing, robot 14 is a vertical articulated robot having a base 34, an upper arm 36 rotatably attached to base 34, a forearm 38 rotatably attached to a front end of upper arm 36, and an end effector 40, such as a robot hand, attached to a front end of forearm 38. Robot 14 is configured to perform a predetermined operation for workpiece 18 before or after being processed by processing machine 12. In the illustrated embodiment, robot 14 is positioned within a working chamber 42 of processing machine 12, and is configured to grip the processed workpiece on table 20 by hand 40, and push the gripped workpiece against a deburring tool 44 such as a grinder arranged in working chamber 42.

Since robot 14 is positioned within working chamber 42 of processing machine 12, the vibration due to the motion of robot 14 may be transmitted to processing machine 12 (in particular, tool driving part 30), whereby machining accuracy (positioning accuracy of tool 22 relative to workpiece 18) of processing machine 12 may be deteriorated. Even if robot 14 is positioned outside processing machine 12 (is not positioned in working chamber 42), the vibration of robot 14 may be transmitted to processing machine 12 via an installation surface when robot 12 is positioned close to or adjacent processing machine 12, whereby the similar problem may occur.

Therefore, in the embodiment, vibration sensors (or acceleration pickups) 46 and 48 are arranged on table 20 and tool driving part 30, respectively, so as to detect the vibration due to the motion of robot 14 by these sensors. Then, at least one of table 20 and processing tool 22 is operated so that the difference (deviation) of the relative position between table 20 and processing tool 22 due to the vibration from robot 14 is reduced (preferably, minimized). Hereinafter, a detail of this process will be explained.

First vibration sensor 46 (in this case, the acceleration sensor) is arranged on or near table 20 and is configured to measure an amount of vibrating displacement of table 20 due to the vibration transmitted from robot 14, etc. Second vibration sensor 48 (in this case, the acceleration sensor) is arranged on or near tool driving part 30 and is configured to measure an amount of vibrating displacement of processing tool 22 due to the vibration transmitted from robot 14, etc. For example, acceleration sensors 46 and 48 may be capacitance sensors, piezoresistive (piezoelectric) sensors, or MEMS (Micro Electro Mechanical Systems) sensors, whereas sensors 46 and 48 are not limited as such. Alternatively, gyro sensors, etc., may be used as vibration sensors 46 and 48.

On the other hand, processing machine controller 16 has: a vibration suppression controlling section 50 configured to operate at least one of table 20 and processing tool 22 during robot 14 performs the predetermined motion, and calculate an amount of motion correction for reducing a change in the relative position between table 20 and processing tool 22 measured by at least one of acceleration sensors 46 and 48; a storing section 52 such as a memory configured to store the amount motion correction calculated by vibration suppression controlling section 50; and a program executing section 54 configured to, during robot 14 performs the predetermined motion, execute the processing program while executing vibration suppressing motion based on the amount of motion correction stored in storing section 52. For example, vibration suppression controlling section 50 and program executing section 54 may be a processor incorporated in processing machine controller 16.

Figure 2:
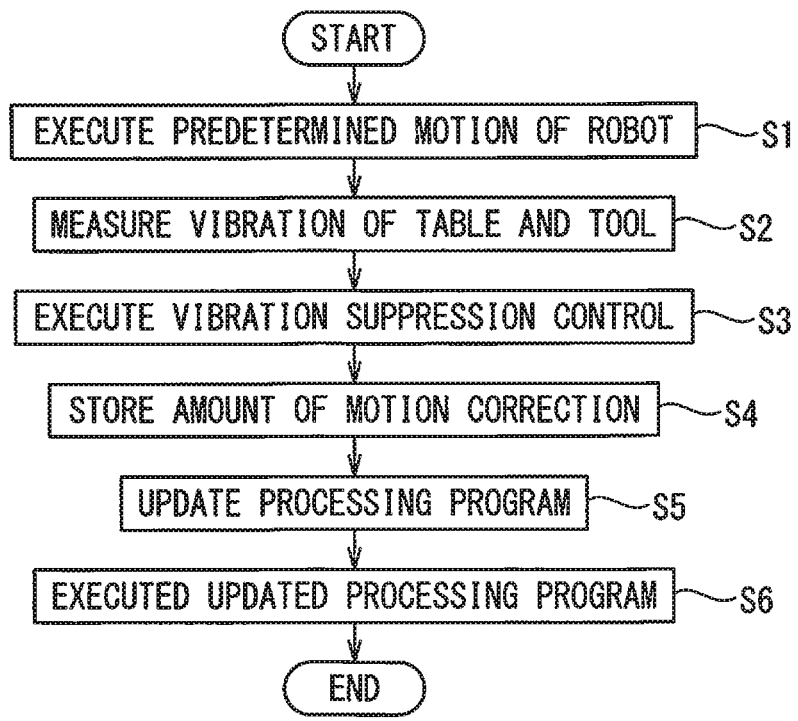
FIG. 2 is a flowchart showing an example of a procedure in the processing system of FIG. 1.

FIG. 2 is a flowchart showing an example of a procedure in the processing system according to the embodiment. First, in step S1, while machine tool 12 is suspended (does not machine workpiece 18), robot 14 is operated so as to perform a predetermined motion associated with machine tool 12. For example, the predetermined motion may be a series of motions, including: gripping the workpiece machined by machine tool 12 by using hand 40; deburring the gripped workpiece by pushing the workpiece against a deburring tool 44 for a certain period of time; and conveying the deburred workpiece to a predetermined place.

Figure 3:
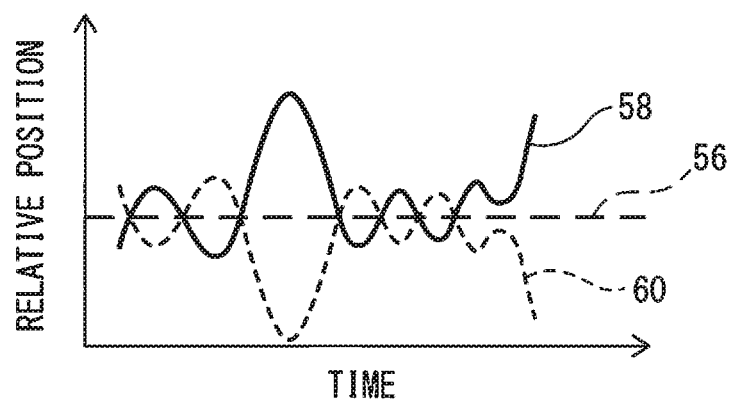
FIG. 3 is a graph showing an example of a temporal change in a relative position between a table and a processing tool.

In the next step S2, during robot 14 performs the predetermined motion in the procedure of step S1, the vibration (or the amount of displacement) of each of table 20 and processing tool 22 is measured by using first and second acceleration sensors 46 and 48, and the change in the relative position between table 20 and processing tool 22 is calculated. By virtue of this procedure, data (a graph 58) can be obtained, which represents a temporal change (difference) in the relative position, in comparison to a state (represented by a reference position 56) in which the vibration from robot 14 is ineffective or negligible, as exemplified in FIG. 3. In this regard, when a three-axis acceleration sensor, etc., is used as the acceleration sensor, data as shown in FIG. 3 can be obtained with respect to each of X-, Y- and Z-axes.

In the next step S3, during the robot performs the predetermined motion, processing machine controller 16 executes the motion control (or vibration suppression control) of table 20 and tool driving part 30 so that the difference of the relative position obtained in step S2 is canceled. For example, at least one of the motion of table 20 and tool driving part 30 is controlled so that the relative position between table 20 and processing tool 22 is changed as shown by a graph 60, which is obtained by inverting graph 58 with respect to reference position 56. In the embodiment, table 20 is operated in order to cancel the differences in the X- and Y-directions, and tool driving part 30 is operated in order to cancel the difference in the Z-direction. By virtue of this, the vibration suppression control can be executed, by which the change in the relative position due to the vibration of robot 14 can be canceled with respect to all of the three axes orthogonal to each other.

As a preferable method for obtaining the result such as graph 60 in step S3, a learning control may be used. For example, during the vibration is transmitted from robot 14 to machine tool 12, with respect to a plurality of combinations of operation conditions of a feed axis (not shown) of table 20 and tool driving part 30, vibration information (or an output of the acceleration sensor) of the vibration of table 20 and processing tool 22 at the respective operation conditions may be stored, and then, from among the vibration information of the motion conditions, a combination in which the deviation of the relative position between table 20 and processing tool 22 is minimum may be learned. In the embodiment, the learning control is executed on the machine tool side, not the robot side. Herein, since various conventional techniques (e.g., as described in JP 2011-167817 A or JP 2011-192267 A) can be applied to the learning control using the output of the acceleration sensor (or the measurement result), the detailed explanation thereof is omitted.

In the next step S4, an amount of correction for canceling the change in the relative position between table 20 and processing tool 22, obtained by the vibration suppression control in step S3, is stored in storing section 52 of machine tool controller 16, etc., as an amount of motion correction for at least one of table 20 and processing tool 22 when machine tool 12 performs normal processing.

In the next step S5, the stored amount of motion correction is added to the motion program (or the processing program) of the machine tool. In other words, the motion program of the machine tool is updated by the amount of motion correction.

In the next step S6, in processing system 10, while machine tool 12 processes the workpiece based on the updated motion program, robot 14 performs the predetermined motion. In other words, during robot 14 performs the motion, the motions of processing table 20 and tool driving part 30 are controlled by using the stored amount of motion correction (or the updated processing program). Therefore, even when the vibration of robot 14 is transmitted table 20 or processing tool 22, the change in the relative position therebetween due to the vibration is corrected or canceled by the amount of motion correction, whereby the workpiece can be machined with high accuracy.

In the embodiment, the change in the relative position is not corrected in real-time. Instead, by using the amount of motion correction, which has been previously obtained by the learning, etc., in the state the machine tool is not operated, the motion in the actual processing is corrected. Therefore, the correction with high accuracy can be executed in the embodiment, whereas such preferable correction may be difficult in real-time, due to the magnitude relationship between a vibration period and a control period, etc. Further, in the embodiment, even if the machine tool and the robot are simultaneously operated, it is not necessary reduce a motion velocity of the robot, whereby a cycle time of the entire processing system can be prevented from being increased, and a working ratio of the system can be improved.

Processing system 10 may have a function to monitor a motion status of robot 14. For example, processing machine controller 16 may be configured to receive the detail of the motion of robot 14 from robot controller 17 in real-time. In this case, when robot 14 does not move for a certain reason (e.g., robot 14 is suspended for security), program executing section 54 may not execute the vibration suppression control, since the processing machine is not subject to the vibration of the robot. By virtue of this, over-correction can be avoided in machine tool 12, when the vibration of the robot is ineffective or negligible.

When processing system 10 has the function to monitor the motion status of robot 14, it is preferable that program executing section 54 cause machine tool 12 to stop operation without executing the processing program, when robot 14 performs a motion other than the predetermined motion. Normally, in the motion other than the predetermined motion, the learning (e.g., obtaining and storing the amount of motion correction) has not been executed. Therefore, an appropriate motion correction cannot be executed on the machine tool side, during robot 14 performs the motion other than the predetermined motion, whereby the machining accuracy of the workpiece may be significantly deteriorated (in other words, a defective workpiece may be generated).

Although the two acceleration sensors are used in the embodiment, second acceleration sensor 48 is not necessary, when processing system 10 is configured so that the vibration is not transmitted to processing tool 22. In such a case, the change in the relative position between table 20 and processing tool 22 can be measured by only first acceleration sensor 46 arranged on table 20. Similarly, first acceleration sensor 46 is not necessary, when processing system 10 is configured so that the vibration is not transmitted to table 20, and in such a case, the change in the relative position between table 20 and processing tool 22 can be measured by only second acceleration sensor 48 arranged on processing tool 22.

Although first acceleration sensor 46 is attached to table 20 in the embodiment, the first acceleration sensor may be attached to another portion, as long as the sensor can measure the acceleration (or the displacement) of table 20. For example, first acceleration sensor 46 may be attached to a jig (not shown) for fixing workpiece 18 to table 20, or may be attached to workpiece 18. On the other hand, although second acceleration sensor 48 is attached to tool driving part 30 in the embodiment, the second acceleration sensor may be attached to another portion, as long as the sensor can measure the acceleration (or the displacement) of tool 22. For example, second acceleration sensor 48 may be directly attached to processing tool 22.

Acceleration sensors 46 and 48 may be detachably attached to machine tool 12. In the embodiment, the acceleration sensors are used when machine tool 12 is suspended (does not process the workpiece) and when robot 14 performs the predetermined motion (or the learning is executed). In other words, the sensors are not used machine tool 12 processes workpiece 18 (or the processing program is executed). Therefore, by removing the acceleration sensors from machine tool 12 during the workpiece is processed, the sensors can be prevented from being polluted by cutting oil, etc., and/or the removed sensors can be used in another system.

According to the present disclosure, the processing accuracy of the processing machine due to the motion of the robot can be prevented from being deteriorated, without reducing the working ratio of the processing system including the processing machine and the robot.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A processing system comprising:
    a processing machine having a workpiece holding part and a processing tool configured to be moved relative to each other, the processing machine being configured to process a workpiece held by the workpiece holding part by using the processing tool based on a predetermined processing program;
    a robot configured to perform a predetermined motion associated with the processing machine;
    a vibration sensor configured to measure a change in a relative position between the workpiece holding part and the processing tool;
    a vibration suppression controlling section configured to operate at least one of the workpiece holding part and the processing tool during the robot performs the predetermined motion, and calculate an amount of motion correction for reducing the change in the relative position measured by the vibration sensor;
    a storing section configured to store the amount motion correction calculated by the vibration suppression controlling section; and
    a program executing section configured to, during the robot performs the predetermined motion, execute the processing program while executing vibration suppressing motion based on the amount of motion correction stored in the storing section.

2. The processing system as set forth in claim 1, wherein the vibration suppression controlling section calculates the amount of motion correction by learning control.

3. The processing system as set forth in claim 1, wherein the vibration sensor is configured to be detachably attached to the processing machine.

4. The processing system as set forth in claim 1, wherein the processing machine has a function to monitor a motion status of the robot, and the program executing section does not execute the vibration suppressing motion when the robot does not perform a motion.

5. The processing system as set forth in claim 1, wherein the processing machine has a function to monitor a motion status of the robot, and the program executing section causes the processing machine to stop operation when the robot performs a motion other than the predetermined motion.

6. A method for controlling a processing machine having a workpiece holding part and a processing tool configured to be moved relative to each other, the processing machine being configured to process a workpiece held by the workpiece holding part by using the processing tool based on a predetermined processing program, the method comprises the steps of:
- measuring a change in a relative position between the workpiece holding part and the processing tool during a robot performs a predetermined motion associated with the processing machine;
- operating at least one of the workpiece holding part and the processing tool, and calculating an amount of motion correction for reducing the measured change in the relative position;
- storing the calculated amount motion correction; and
- executing, during the robot performs the predetermined motion, the processing program while executing vibration suppressing motion based on the stored amount of motion correction.

\* \* \* \* \*